May 14, 1946.  A. A. REITER ET AL  2,400,466
SEPARATION OF HIGHER PHENOLS FROM WOOD DISTILLATE
Filed Sept. 29, 1942
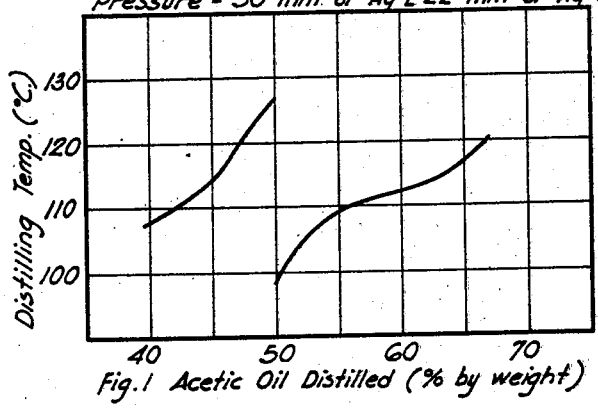
Fig. 1 Acetic Oil Distilled (% by weight)
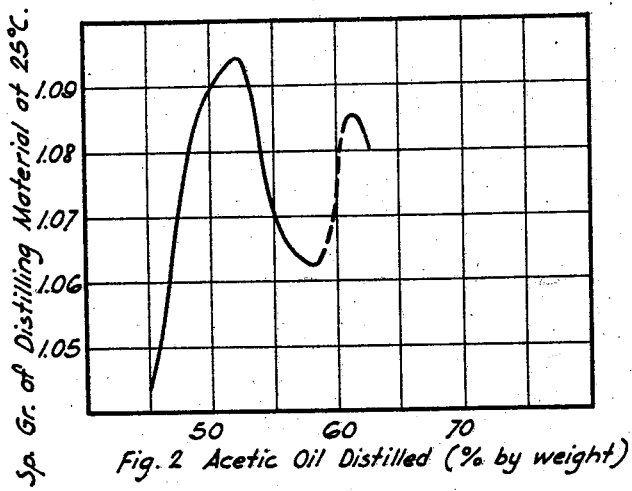
Fig. 2 Acetic Oil Distilled (% by weight)
INVENTORS
Alfred A. Reiter
Floyd L. Beman
BY
Griswold & Burdick
ATTORNEYS

UNITED STATES PATENT OFFICE 2,400,466

SEPARATION OF HIGHER PHENOLS FROM WOOD DISTILLATE

Alfred A. Reiter and Floyd L. Beman, Marquette, Mich., assignors to Cliffs Dow Chemical Company, Marquette, Mich., a corporation of Michigan Application September 29, 1942, Serial No. 460,170

19 Claims. (Cl. 202—71)

This invention relates to the isolation of higher phenols from wood distillate and more particularly to their isolation from a certain residue fraction of pyroligneous acid.

In the more recently developed methods for the treatment of pyroligneous acid, particularly that derived from hardwoods by distillation and extraction methods for the recovery of methanol, acetone, and acetic acid, the residues which, in the older liming process, usually appeared as tar, are separated to a considerable extent into heavier or settled tars and a mixture of organic compounds which are soluble in the crude aqueous acetic acid remaining after the pyroligneous acid is demethanolized and settled, and which are steam distilled from the aqueous solution along with the acetic acid. Such mixture of soluble organic compounds usually appears as a non-tarry organic liquid after removal of the water and a major portion of the lower aliphatic acids from the distillate obtained by exhaustive steam distillation of demethanolized and settled pyroligneous acid, and is herein designated as "acetic oil" to distinguish it from other portions of tars or oils appearing in the process. In one typical process the acetic oil is obtained by steam-distilling the demethanolized and settled pyroligneous acid without previous chemical treatment, extracting the aqueous distillate with an organic solvent, such as butyl acetate, ethyl acetate, ether, mixtures of ethyl acetate with isopropyl ether, etc., recovering the solvent by distilling it from the extract at atmospheric pressure, and fractionally distilling the remaining portion of the extract under reduced pressure to recover crude acetic acid and leave the acetic oil as a still residue. Acetic oil so obtained corresponds closely with the still residue remaining when the crude acid of United States Patent 2,197,069 is fractionally distilled under reduced pressure to recover therefrom a major proportion of the acetic acid. Acetic oil obtained in this manner amounts to a substantial portion of the total organic products obtained from pyroligneous acid produced in the destructive distillation of hardwoods such as maple, beech, birch, and oak.

Although the character of the acetic oil obtained as described above may vary somewhat, depending upon the exact manner of carrying out the several operations of the process, it is usually obtained as a substantially anhydrous, non-viscous, acidic liquid which is at least partially soluble in water or dilute acetic acid, and miscible with most organic solvents. The specific gravity of the acetic oil is usually greater than 1.0.

Relatively little, if any, information concerning the composition of acetic oil has heretofore been available other than that it is a complex mixture of compounds containing phenolic substances and minor proportions of lower aliphatic acids, e. g. acetic and propionic acids. The latter may be recovered in small amounts from the acetic oil by steam distillation. Mixtures containing guaiacol have been recovered from the oil by extraction with an excess of a strong alkali. Separation of the guaiacol from mixtures obtained in this manner is difficult and requires repeated distillation or crystallization due to the presence in the crude guaiacol of acids and of other phenolic constituents of the acetic oil, e. g. phenol, cresols, cresol and the like. Furthermore, as we have shown in our concurrently filed and copending applications, Serial Nos. 460,167, 460,168, and 508,424, acetic oil contains other valuable compounds, e. g. esters such as 2-acetoxybutanal and acetol acetate, which are rapidly hydrolyzed in the presence of alkalies and the recovery of guaiacol from acetic oil in the above manner is undesirable since it is impossible to recover at the same time these valuable esters. Treatment of the acetic oil with other conventional agents, such as with mineral acids, or by distillation at ordinary pressure also tends to destroy these sensitive and valuable compounds. Fractional distillation of the acetic oil under reduced pressure by the ordinary procedures is not feasible because the gradual and substantially constant rise of the distilling temperature and the variation in composition previously referred to make it impossible to select accurately a fraction rich in a desired higher phenol, i. e. in a phenolic compound of molecular weight higher than that of phenol itself, such as guaiacol or creosol, by observing the distilling temperature in the ordinary manner. This is illustrated in Fig. 1 in which distilling temperatures in the region encompassing the distillation under reduced pressure of guaiacol and creosol from a typical sample of acetic oil are shown plotted against the per cent by weight of the acetic oil distilled. At no point in this region is there a sufficient break in the steady and continuous rise in the distilling temperature to permit selection of a fraction rich in a higher phenol. The discontinuity in the graph in Fig. 1 is due to the pressure having been lowered from about 50 millimeters to about 22 millimeters during the distillation of the guaiacol-rich fraction to avoid decomposition in the still. Due to the complexity of acetic oil and to the absence of economical methods for isolating valuable components from it, the oil has heretofore been used principally as fuel.

We have found that when acetic oil is fractionally distilled under reduced pressure and the specific gravity of the material distilling is continuously determined, its value passes through a series of regions in which its average rate of change with respect to the amount of material distilled is alternately relatively large and relatively small and that the regions wherein the average rate of change is relatively small, i. e. regions wherein the average rate of change of the specific gravity approaches and passes through a minimum value, correspond to regions in which fractions relatively rich in a single component are distilling. Thus, the portion distilling while the specific gravity is passing through such a region and while the vapor temperature is in the neighborhood of the boiling point of guaiacol, i. e. in the neighborhood of 124° C. at a pressure of 50 millimeters of mercury, is rich in guaiacol. Similarly, the portion distilling while the vapor temperature is in the neighborhood of 113° C. at a pressure of 22 millimeters of mercury, i. e. in the neighborhood of the boiling point of creosol at the corresponding pressure, and while the specific gravity of the material distilling is passing through a region wherein its average rate of change with respect to the amount of material distilled is relatively small, is rich in creosol. Fractions rich in other components may be selected in a similar manner. We have further found, that if a fraction so selected which is rich in a higher phenol, such as guaiacol or creosol, is treated with calcium hydroxide to precipitate the calcium salt of the phenol and the precipitated phenolate then separated, e. g. by filtering the mixture, the phenol which may be recovered from the separated calcium salt by acidification may then be purified easily by dissolving it in a strong alkali such as sodium hydroxide, and steam distilling the solution. The purified guaiacol or creosol may be recovered from the alkaline solution by acidifying. By operating in this manner, it is possible to separate guaiacol and creosol economically and in substantially pure form from acetic oil and at the same time leave the major portion of the other valuable components of the oil in recoverable form.

The graph in Fig. 2 of the drawing was obtained by periodically noting the specific gravity of the material distilling in the neighborhood of 124° C. at a pressure of 50 millimeters of mercury and in the neighborhood of 113° C. at 22 millimeters of pressure during the distillation of acetic oil just referred to and plotting these values against the per cent by weight of acetic oil distilled. It is apparent that although the accurate selection of a fraction rich in a higher phenol, e. g. in guaiacol or creosol, by observing the distilling temperature, is impossible due to the gradual and substantially constant rise in the temperature, such a fraction may be selected readily by observing the specific gravity of the material condensing. Thus, acetic oil may be distilled under reflux and collection of a fraction rich in guaiacol begun when the specific gravity of the material distilling is approaching a region wherein its average rate of change with respect to the amount of material distilled is relatively small, and terminated when the specific gravity has passed through and is receding from this region. A fraction rich in creosol may be collected in a similar manner. It should be mentioned that, although the fraction is selected by observing the specific gravity of the material distilling rather than by observing the distilling temperature, the latter should also be noted since it will serve to differentiate the guaiacol- and creosol-containing fractions from each other and from fractions rich in other components of the acetic oil which might be collected over the same range of specific gravities but which boil over different temperature ranges. Ordinarily, the distilling temperature range of the guaiacol- or creosol-containing fraction will include or lie close to, e. g. within about 15° C. of, the boiling point of the respective phenol under the same pressure, but the major portion of the fraction frequently distills either above or below the boiling point of pure guaiacol or creosol. Other fractions of wood distillate which contain these phenols, such as settled tars, heavy distillates and the like, may be similarly distilled to obtain fractions rich in guaiacol or creosol.

The fraction of distillate rich in a higher phenol obtained by distilling acetic oil in the manner described above may then be treated with water and calcium hydroxide, whereby the calcium salt of the phenol is precipitated. It should be mentioned that the creosol-rich fraction which usually contains an appreciable quantity of methyl cyclopentenolone along with the creosol may, prior to the treatment with calcium hydroxide and water, be advantageously steam distilled since, by so doing, separation of the methyl cyclopentenolone and creosol may be effected. The creosol distills with the steam and may be recovered from the oily portion of the distillate by the herein described method while the methyl cyclopentenolone remains in the still as a residue and may be recovered readily therefrom in purified form by cooling and washing the residue with water and crystallizing the washed product. Precipitation of the calcium salt is usually carried out by stirring the phenol-containing fraction into a mixture of calcium hydroxide and water, preferably at temperatures above 30° C., since at lower temperatures the precipitate tends to be gummy and hard to handle. The tendency of the precipitate to form a gummy mass increases with the amount of impurities present. These impurities may consist of acids or phenolic compounds which form insoluble but non-crystalline calcium salts. This tendency may be overcome up to a certain point by increasing the temperature of the mixture. However, if the phenol-containing fraction contains too great an amount of these impurities, such as may occur when the fraction is selected by observing the distilling temperature of the acetic oil, the precipitate will be of unsatisfactory character regardless of the temperature. When the fraction is selected by observing the specific gravity of the material distilling and the calcium salt is precipitated as described above, a granular, easily handled precipitate is obtained. A slight excess of calcium hydroxide over that necessary to form the normal calcium salt is ordinarily used, but the excess need not be large. Wash water from a preceding batch of calcium phenolate may be used in preparing the calcium hydroxide slurry and the calcium phenolate dissolved in the wash water thereby be saved. If desired, the phenol-containing fraction may be treated with sodium hydroxide or other alkali metal hydroxide solution to dissolve the phenol and the calcium phenolate then precipitated by adding a soluble calcium salt, such as calcium chloride. The precipitated phenolate is then separated from the mixture, e. g. by filtration. The separated phenolate may advantageously be washed with hot water in order to remove oily impurities or the phenolate may, if desired, be stirred with water and the mixture steam distilled until the oily impurities have substantially all distilled. The washing of the precipitate may be accomplished on the filter or by removing the precipitate from the filter and stirring it with the washing liquid in a separate container and then refiltering. The calcium salt is stirred with water and acidified and the guaiacol or creosol removed from the aqueous portion of the mixture, e. g. by mechanical separation or by distillation with steam. The phenol is then further purified by dissolving it in a solution of an alkali metal hydroxide, such as sodium hydroxide or potassium hydroxide, and steam distilling the solution to remove alkali-insoluble compounds. A moderate excess of alkali should be used and steam distillation should be continued until substantially pure water condenses, i. e. until all of the material which will distill with steam has been removed. The steam distillation is ordinarily carried out at atmospheric pressure, but any convenient pressure may be used. After steam distillation is complete, the alkaline solution may be acidified to liberate the guaiacol or creosol and the latter separated from the aqueous portion of the mixture, either mechanically or by steam distilling and the separated product fractionally distilled. In this manner, the removal and separation of guaiacol or of creosol from acetic oil is accomplished with a high degree of efficiency and the recovery of other valuable components of the acetic oil is, at the same time, not prevented.

Certain advantages of the invention will be seen from the following examples, which are illustrative and are not to be construed as limiting the invention.

*Example 1*

1360 pounds of acetic oil were distilled at a pressure of 50 millimeters of mercury through an efficient fractionating column while maintaining a reflux ratio of about 8 to 1. The specific gravity at 25° C. of the material condensing and the vapor temperature in the still head were noted periodically. The distilling temperature rose gradually without remaining constant at any one point for an appreciable length of time. The specific gravity of the material distilling varied in a substantially regular manner through a series of regions in which its average rate of change with respect to the amount of material distilled was successively relatively large and relatively small. When the temperature had reached 118° C. and the specific gravity of the material distilling was 1.058 and increasing, the collection of the guaiacol-containing fraction was begun. Collection of the fraction was continued until the specific gravity after having increased to 1.094 had decreased to 1.065, at which point the collection of the guaiacol-rich fraction was terminated and collection of the creosol-rich fraction begun. During the collection of the guaiacol fraction, the pressure was reduced from about 50 millimeters to about 22 millimeters of mercury to facilitate distillation and to avoid any tendency toward excessive decomposition in the still. The fraction weighed 134.9 pounds. Distillation was continued until the specific gravity of the distilling material had decreased to below 1.062 and then increased to 1.078 at which point the distilling temperature was 113.5° C. The collection of the creosol fraction was terminated at this point. The specific gravity of the material distilling was not taken continuously during the collection of the creosol-rich fraction due to the separation of crystals of methyl cyclopentenolone from the distillate obtained during the collection of the middle portion of the fraction. The creosol-rich fraction weighed 84 pounds.

Several fractions rich in guaiacol obtained in the manner just described were combined and 178 pounds of the material was added with vigorous agitation to a mixture of 700 pounds of water and 59.5 pounds of hydrated lime at 90° C. The mixture was stirred for a short time and then filtered and the calcium guaiacolate washed with several portions of hot water totaling 713 pounds. The washings were saved and used in making up succeeding batches of calcium salt. The calcium guaiacolate, obtained in this manner as a grey precipitate, was mixed with water and acidified with 76.5 pounds of 32 percent hydrochloric acid and the acidified mixture was steam distilled. 65 pounds of an oil with a high guaiacol content separated from the distillate. This oil was further purified by dissolving it in water containing 18.8 pounds of sodium hydroxide and steam distilling the resulting alkaline mixture. 6.5 pounds of an oil lighter than water was first removed followed by 2.4 pounds of an oil heavier than water. When the oil had stopped coming over with the steam, the sodium guaiacolate solution was acidified with 24.1 pounds of sulphuric acid and the guaiacol removed by steam distillation. The guaiacol layer which separated from the steam distillate weighed 54.7 pounds. Upon fractionally distilling the guaiacol layer, there were obtained a low-boiling fore-fraction and 40.4 pounds of pure guaiacol. A small amount of residue remained in the still.

*Example 2*

873 pounds of a creosol-rich fraction of acetic oil obtained in the manner described in Example 1 were distilled with steam. 715 pounds of crude creosol distilled with the steam and the methyl cyclopentenolone present in the creosol-rich fraction remained in the still. The still residue was cooled, filtered and washed with water. There were thus obtained 131 pounds of crude methyl cyclopentenolone which, upon crystallization from water, yielded a product melting at 105° C. 59.5 pounds of the crude creosol which separated from the distillate as an insoluble oil were added to a slurry of 29.8 pounds of hydrated lime in 238 pounds of water at 90° C. and, after stirring for 30 minutes, the insoluble calcium salt was separated by filtering. The filter cake was washed three times with portions of hot water weighing 80 pounds each. The washed cake was then mixed with 40 pounds of water and acidified with 64.6 pounds of 32 per cent hydrochloric acid. The acidified mixture was distilled with steam and 24.7 pounds of insoluble crude creosol were separated from the distillate. The separated oil was treated with 7.15 pounds of sodium hydroxide dissolved in 27 pounds of water and 5.8 pounds of insoluble oil were distilled from the solution with steam. The aqueous residue in the still was acidified with 11.2 pounds of 80 per cent sulphuric acid and 17.5 pounds of creosol-containing oil were steam distilled from the acidified mixture. The creosol-containing oil was separated from the aqueous portion of the distillate and fractionally distilled with reflux under reduced pressure. There were thus obtained 3.56 pounds of crude guaiacol, 5.4 pounds of an intermediate fraction, and 6.95 pounds of pure creosol.

Other modes of applying the principle of the invention may be employed instead of those explained, change being made as regards the method herein disclosed, provided the step or steps stated by any of the following claims or the equivalent of such stated step or steps be employed.

We, therefore, particularly point out and distinctly claim as our invention:

1. In a method for separating a higher phenol from a mixture selected from the class consisting of wood distillate and a residue portion thereof, the steps which consist in precipitating the calcium salt of the higher phenol from a fraction of such mixture rich in said higher phenol, separating the precipitated salt, decomposing the calcium salt by acidifying, dissolving the regenerated higher phenol in an aqueous alkali metal hydroxide, steam distilling the alkaline solution and recovering the higher phenol from the alkaline residue.

2. In a method for separating a higher phenol from a mixture selected from the class consisting of wood distillate and a residue portion thereof, the steps which consist in precipitating the calcium salt of the higher phenol at a temperature above 30° C. from a fraction of such mixture rich in said higher phenol, separating the precipitated salt, decomposing the calcium salt by acidifying, dissolving the regenerated higher phenol in an aqueous alkali metal hydroxide, steam distilling the alkaline solution and recovering the higher phenol from the alkaline residue.

3. In a method for separating a higher phenol from a mixture selected from the class consisting of wood distillate and a residue portion thereof, the steps which consist in treating a fraction of such mixture rich in said higher phenol in aqueous suspension with calcium hydroxide thereby to precipitate the calcium salt of the higher phenol, separating the precipitated salt, decomposing the calcium salt by acidifying, dissolving the regenerated higher phenol in an aqueous alkali metal hydroxide, steam distilling the alkaline solution and recovering the higher phenol from the alkaline residue.

4. In a method for separating a higher phenol from a mixture selected from the class consisting of wood distillate and a residue portion thereof, the steps which consist in treating a fraction of such mixture rich in said higher phenol in aqueous suspension at a temperature above 30° C. with calcium hydroxide thereby to precipitate the calcium salt of the higher phenol, separating the precipitated salt, decomposing the calcium salt by acidifying, dissolving the regenerated higher phenol in an aqueous alkali metal hydroxide, steam distilling the alkaline solution and recovering the higher phenol from the alkaline residue.

5. In a method for separating a higher phenol from a mixture selected from the class consisting of wood distillate and a residue portion thereof, the steps which consist in treating a fraction of such mixture rich in said higher phenol in aqueous suspension at a temperature above 30° C. with calcium hydroxide thereby to precipitate the calcium salt of the higher phenol, separating the precipitated salt, decomposing the calcium salt by acidifying, dissolving the regenerated higher phenol in aqueous alkali metal hydroxide, steam distilling the alkaline solution, acidifying the alkaline residue, separating the higher phenol from the acidified mixture and fractionally distilling the separated higher phenol.

6. In a method for separating a higher phenol from a mixture selected from the class consisting of wood distillate and a residue portion thereof, the steps which consist in treating a fraction of such mixture rich in said higher phenol in aqueous suspension with calcium hydroxide thereby to precipitate the calcium salt of the higher phenol, separating the precipitated salt, decomposing the separated calcium salt by acidifying, dissolving the regenerated higher phenol in an aqueous alkali metal hydroxide, steam-distilling the alkaline solution, acidifying the alkaline residue, separating the higher phenol from the acidified mixture and fractionally distilling the separated higher phenol.

7. In a method for separating a higher phenol from acetic oil, the steps which consist in treating a fraction of the acetic oil rich in said higher phenol in aqueous suspension with calcium hydroxide thereby to precipitate the calcium salt of the higher phenol, separating and washing the precipitated salt, decomposing the washed calcium salt by acidifying, dissolving the regenerated higher phenol in aqueous alkali metal hydroxide, steam-distilling the alkaline solution, acidifying the alkaline residue, separating the higher phenol from the acidified mixture and fractionally distilling the separated higher phenol.

8. In a method for separating guaiacol from acetic oil, the steps which consist in treating a fraction of the acetic oil rich in guaiacol in aqueous suspension with calcium hydroxide thereby to precipitate the calcium salt of guaiacol, separating and washing the precipitated salt, decomposing the washed calcium salt by acidifying, dissolving the regenerated guaiacol in aqueous alkali metal hydroxide, steam-distilling the alkaline solution, acidifying the alkaline residue, separating the guaiacol from the acidified mixture and fractionally distilling the separated guaiacol.

9. In a method for separating creosol from acetic oil, the steps which consist in treating a fraction of the acetic oil rich in creosol in aqueous suspension with calcium hydroxide thereby to precipitate the calcium salt of creosol, separating and washing the precipitated salt, decomposing the washed calcium salt by acidifying, dissolving the regenerated creosol in aqueous alkali metal hydroxide, steam-distilling the alkaline solution, acidifying the alkaline residue, separating the creosol from the acidified mixture and fractionally distilling the separated creosol.

10. In a method for separating a higher phenol from a mixture selected from the class consisting of wood distillate and a residue fraction thereof, the steps which consist in fractionally distilling the mixture and beginning collection of a fraction, which distills at temperatures in the neighborhood of the boiling point of the higher phenol at the distillation pressure, when the specific gravity of the material distilling is receding from a region in which there was a reversal of the direction of change in its gravity and is approaching a region wherein its average rate of change with respect to the amount of material distilled is relatively small, terminating the collection of the fraction when the specific gravity has passed through and is receding from the last mentioned region, and precipitating the calcium salt of the higher phenol from the collected fraction.

11. In a method for separating a higher phenol from a mixture selected from the class consisting of wood distillate and a residue fraction thereof, the steps which consist in fractionally distilling the mixture and beginning collection of a fraction, which distills at temperatures in the neighborhood of the boiling point of the higher phenol at the distillation pressure, when the specific gravity of the material distilling is receding from a region in which there was a reversal of the direction of change in its gravity and is approaching a region wherein its average of rate of change with respect to the amount of material distilled is relatively small, terminating the collection of the fraction when the specific gravity has passed through and is receding from the last mentioned region, precipitating the calcium salt of the higher phenol from the collected fraction, separating the precipitated salt, decomposing the separated calcium salt by acidifying, dissolving the regenerated higher phenol in an aqueous alkali metal hydroxide, steam-distilling the alkaline solution and recovering the higher phenol from the alkaline residue.

12. In a method for separating a higher phenol from a mixture selected from the class consisting of wood distillate and a residue fraction thereof, the steps which consist in fractionally distilling the mixture and beginning collection of a fraction, which distills at temperatures in the neighborhood of the boiling point of the higher phenol at the distillation pressure, when the specific gravity of the material distilling is receding from a region in which there was a reversal of the direction of change in its gravity and is approaching a region wherein its average rate of change with respect to the amount of material distilled is relatively small, terminating the collection of the fraction when the specific gravity has passed through and is receding from the last mentioned region, treating the collected fraction in aqueous suspension with calcium hydroxide thereby to precipitate the calcium salt of the higher phenol, decomposing the calcium salt by acidifying, dissolving the regenerated higher phenol in an aqueous alkali metal hydroxide, steam-distilling the alkaline solution and recovering the higher phenol from the alkaline residue.

13. In a method for separating a higher phenol from a mixture selected from the class consisting of wood distillate and a residue fraction thereof, the steps which consist in fractionally distilling the mixture and beginning collection of a fraction, which distills at temperatures in the neighborhood of the boiling point of the higher phenol at the distillation pressure, when the specific gravity of the material distilling is receding from a region in which there was a reversal of the direction of change in its gravity and is approaching a region wherein its average rate of change with respect to the amount of material distilled is relatively small, terminating the collection of the fraction when the specific gravity has passed through and is receding from the last mentioned region, treating the collected fraction at a temperature above 30° C. in aqueous suspension with calcium hydroxide thereby to precipitate the calcium salt of the higher phenol, decomposing the calcium salt by acidifying, dissolving the regenerated higher phenol in an aqueous alkali metal hydroxide, steam-distilling the alkaline solution and recovering the higher phenol from the alkaline residue.

14. In a method for separating a higher phenol from acetic oil, the steps which consist in fractionally distilling the acetic oil and beginning collection of a fraction, which distills at temperatures in the neighborhood of the boiling point of the higher phenol at the distillation pressure, when the specific gravity of the material distilling is receding from a region in which there was a reversal of the direction of change in its gravity and is approaching a region wherein its average rate of change with respect to the amount of material distilled is relatively small, terminating the collection of the fraction when the specific gravity has passed through and is receding from the last mentioned region, treating the collected fraction at a temperature above 30° C. in aqueous suspension with calcium hydroxide thereby to precipitate the calcium salt of the higher phenol, decomposing the calcium salt by acidifying, dissolving the regenerated higher phenol in an aqueous alkali metal hydroxide, steam-distilling the alkaline solution and recovering the higher phenol from the alkaline residue.

15. In a method for separating guaiacol from acetic oil, the steps which consist in fractionally distilling the acetic oil and beginning collection of a fraction, which distills at temperatures in the neighborhood of the boiling point of guaiacol at the distillation pressure, when the specific gravity of the material distilling is receding from a region in which there was a reversal of the direction of change in its gravity and is approaching a region wherein its average rate of change with respect to the amount of material distilled is relatively small, terminating the collection of the fraction when the specific gravity has passed through and is receding from the last mentioned region, treating the collected fraction at a temperature above 30° C. in aqueous suspension with calcium hydroxide thereby to precipitate the calcium salt of guaiacol, decomposing the calcium salt by acidifying, dissolving the regenerated guaiacol in an aqueous alkali metal hydroxide, steam-distilling the alkaline solution and recovering the guaiacol from the alkaline residue.

16. In a method for separating creosol from acetic oil, the steps which consist in fractionally distilling the acetic oil and beginning collection of a fraction, which distills at temperatures in the neighborhood of the boiling point of creosol at the distillation pressure, when the specific gravity of the material distilling is receding from a region in which there was a reversal of the direction of change in its gravity and is approaching a region wherein its average rate of change with respect to the amount of material distilled is relatively small, terminating the collection of the fraction when the specific gravity has passed through and is receding from the last mentioned region, treating the collected fraction at a temperature above 30° C. in aqueous suspension with calcium hydroxide thereby to precipitate the calcium salt of creosol, decomposing the calcium salt by acidifying, dissolving the regenerated creosol in an aqueous alkali metal hydroxide, steam-distilling the alkaline solution and recovering the creosol from the alkaline residue.

17. In a method for separating creosol from acetic oil, the steps which consist in fractionally distilling the acetic oil and beginning collection of a fraction, which distills at temperatures in the neighborhood of the boiling point of creosol at the distillation pressure, when the specific gravity of the material distilling is receding from a region in which there was a reversal of the direction of change in its gravity and is approaching a region wherein its average rate of change with respect to the amount of material distilled is relatively small, terminating the collection of the fraction when the specific gravity has passed through and is receding from the last mentioned region, steam distilling the collected fraction thereby to separate a creosol-rich portion thereof and leave a residue rich in methyl cyclopentenolone, treating the creosol-rich portion at a temperature above 30° C. in aqueous suspension with calcium hydroxide thereby to precipitate the calcium salt of creosol, decomposing the calcium salt by acidifying, dissolving the regenerated creosol in an aqueous alkali metal hydroxide, steam-distilling the alkaline solution and recovering the creosol from the alkaline residue.

18. In a method for separating guaiacol from acetic oil wherein the acetic oil is fractionally distilled and a fraction rich in guaiacol is collected, the steps which consist in beginning collection of the fraction when the specific gravity of the material distilling is receding from a region in which there was a reversal of the direction of change in its gravity and is approaching a region wherein its average rate of change with respect to the amount of material distilled is relatively small and terminating collection of the fraction when the specific gravity has passed through and is receding from the last mentioned region.

19. In a method for separating creosol from acetic oil wherein the actic oil is fractionally distilled and a fraction rich in creosol is collected, the steps which consist in beginning collection of the fraction when the specific gravity of the material distilling is receding from a region in which there was a reversal of the direction of change in its gravity and is approaching a region wherein its average rate of change with respect to the amount of material distilled is relatively small and terminating collection of the fraction when the specific gravity has passed through and is receding from the last mentioned region.

ALFRED A. REITER.
FLOYD L. BEMAN.